Nov. 17, 1936.  R. M. JACKSON  2,060,992
COOKER
Filed Dec. 29, 1934  5 Sheets-Sheet 2
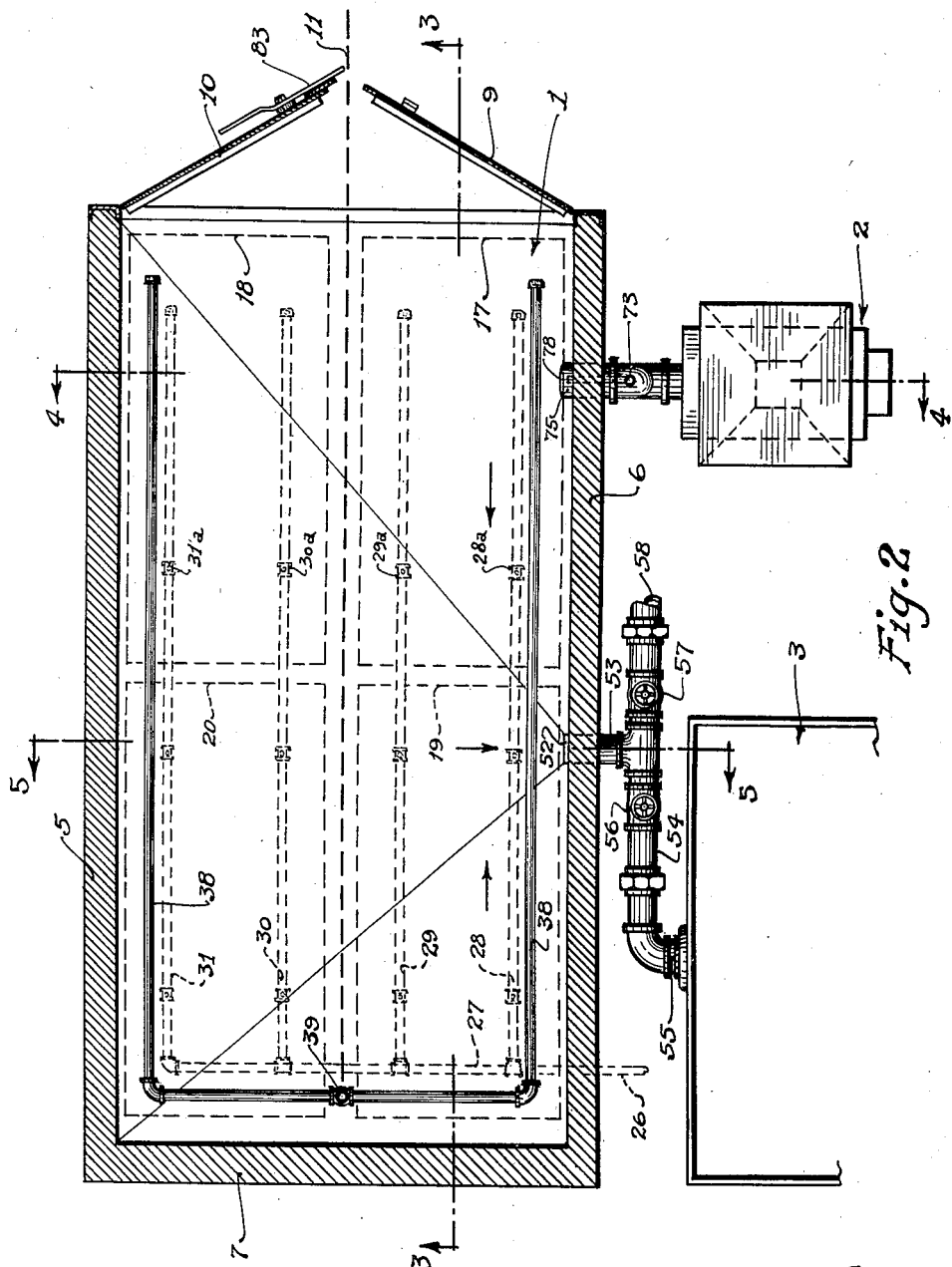
Fig.2
Robert M. Jackson
INVENTOR
BY 
ATTORNEY Patented Nov. 17, 1936

2,060,992

UNITED STATES PATENT OFFICE 2,060,992

COOKER

Robert M. Jackson, Portland, Oreg., assignor to Industrial Patents Corporation, Chicago, Ill., a corporation of Delaware Application December 29, 1934, Serial No. 759,612

12 Claims. (Cl. 53—15)

This invention relates to a device for the treatment of food products.

An object of the invention is to provide a cooker.

Another object of the invention is to provide a food coloring device.

Another object of the invention is to provide an efficient smokehouse.

Another object of the invention is to provide a device for the simultaneous smoking and cooking of meat.

Another object of the invention is to provide a device for the simultaneous smoking, cooking and coloring of meat products.

Other objects of the invention will be apparent from the description and claims which follow.

Numerous devices have been proposed from time to time for cooking meat. Other devices have been proposed for smoking meat. It has also been proposed to simultaneously cook and color meat by the use of hot water containing coloring matter, as in the case of colored frankfurters.

The present invention relates to an apparatus in which all of these operations may be performed simultaneously or in such sequence or combination as may be desired.

In the accompanying drawings which form a part of this specification, similar reference characters in the several figures designate similar parts.

Figure 2 is a plan view, partly in section.

Figure 1:
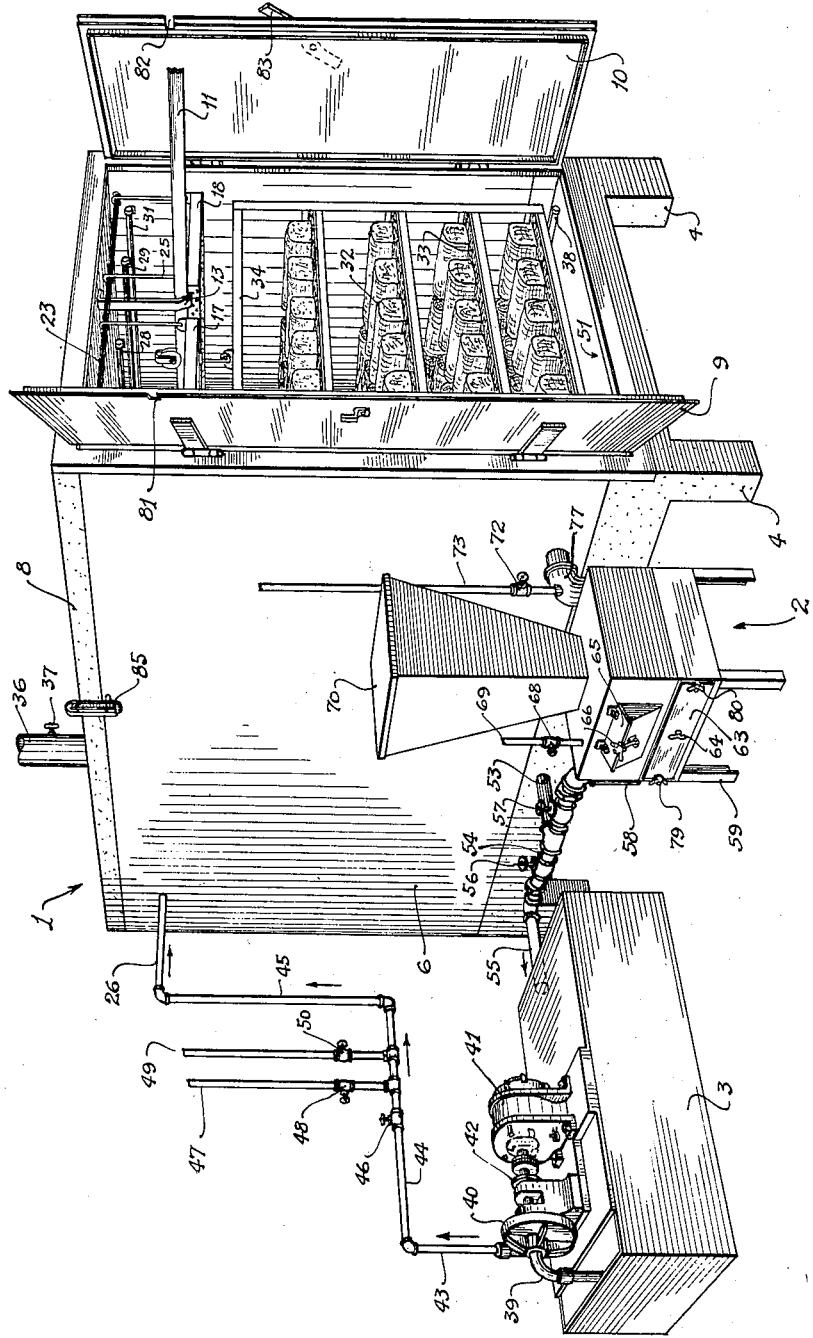
Figure 1 is a perspective view, illustrating one embodiment of the present invention.
Figure 3:
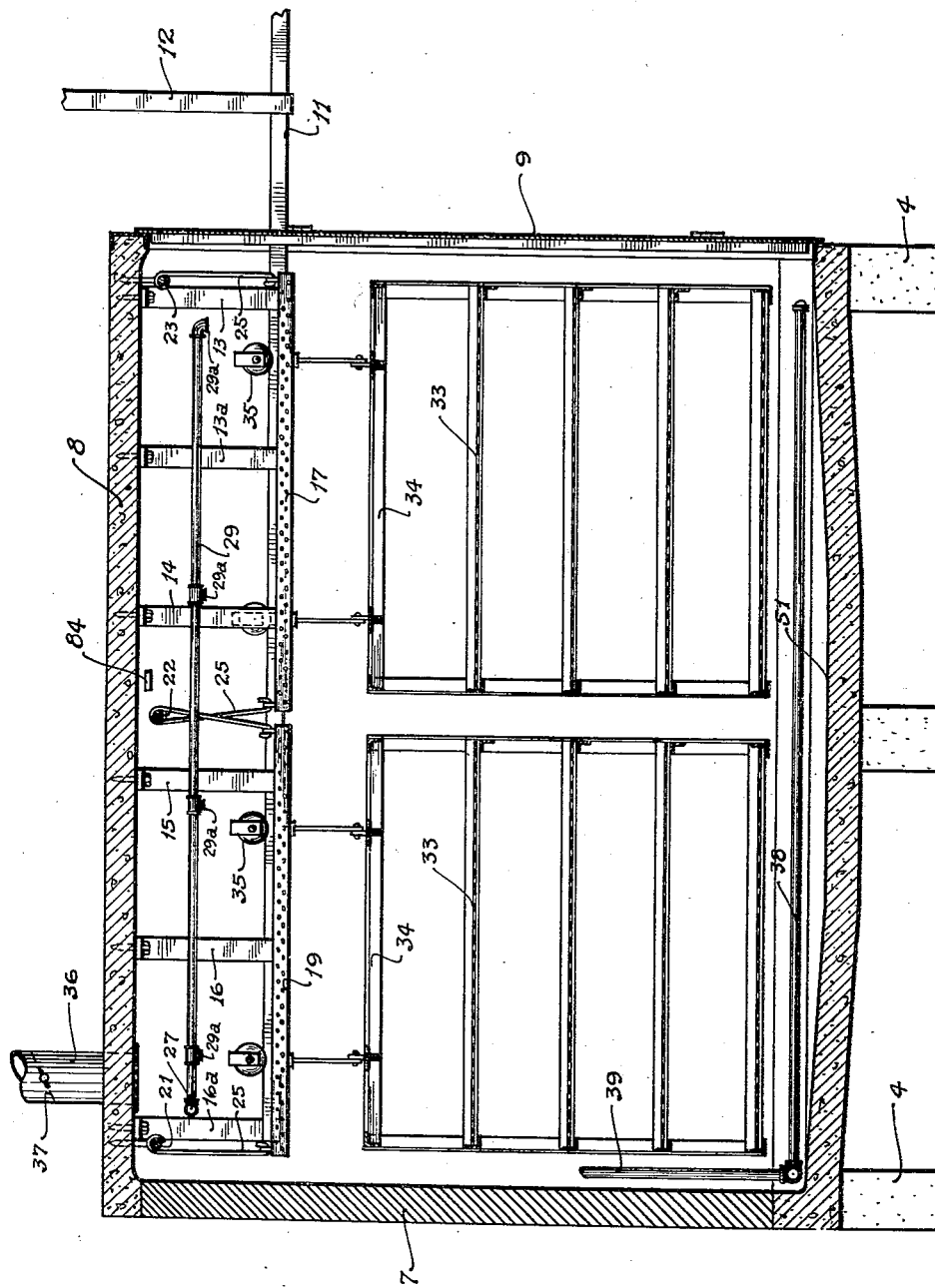
Figure 3 is a sectional view taken on line 3—3 of Figure 2.
Figure 4:
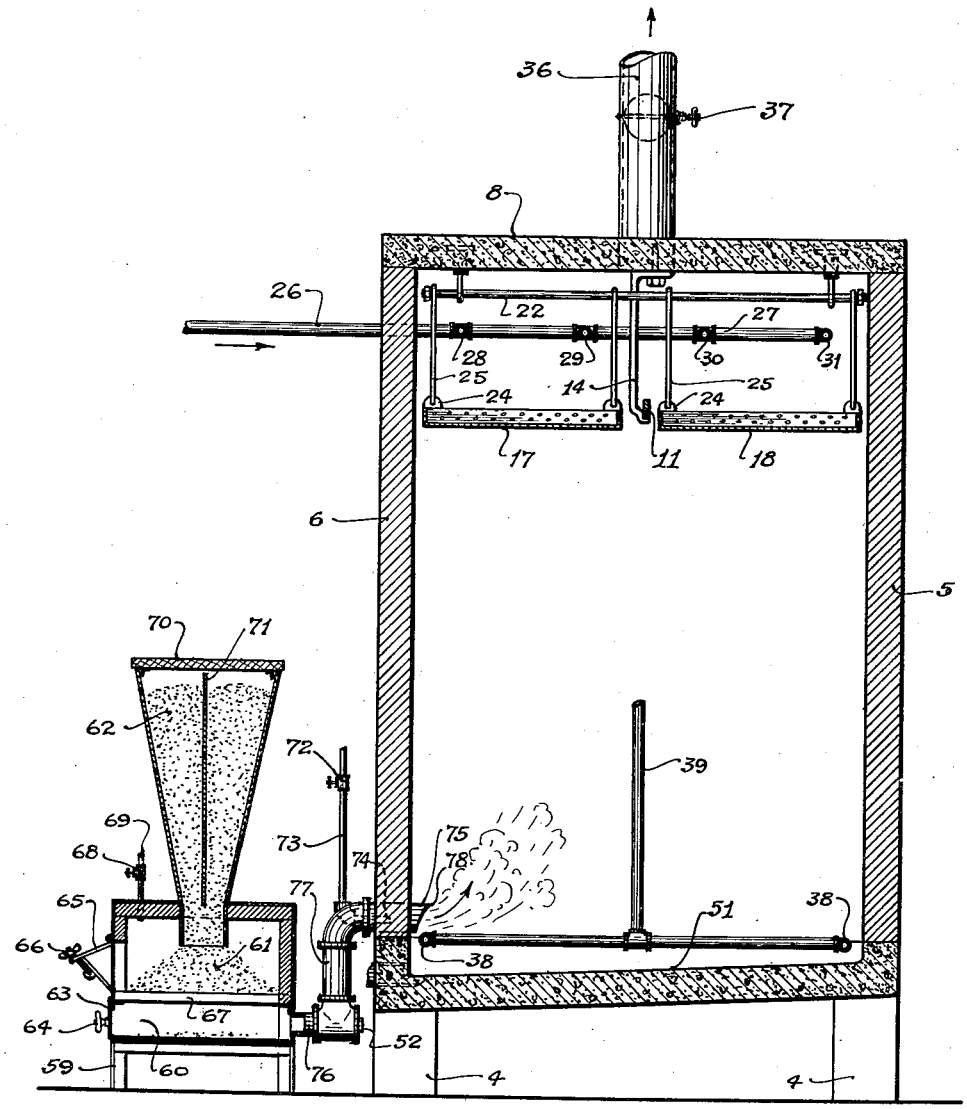
Figure 4 is a sectional view taken on line 4—4 of Figure 2.
Figure 5:
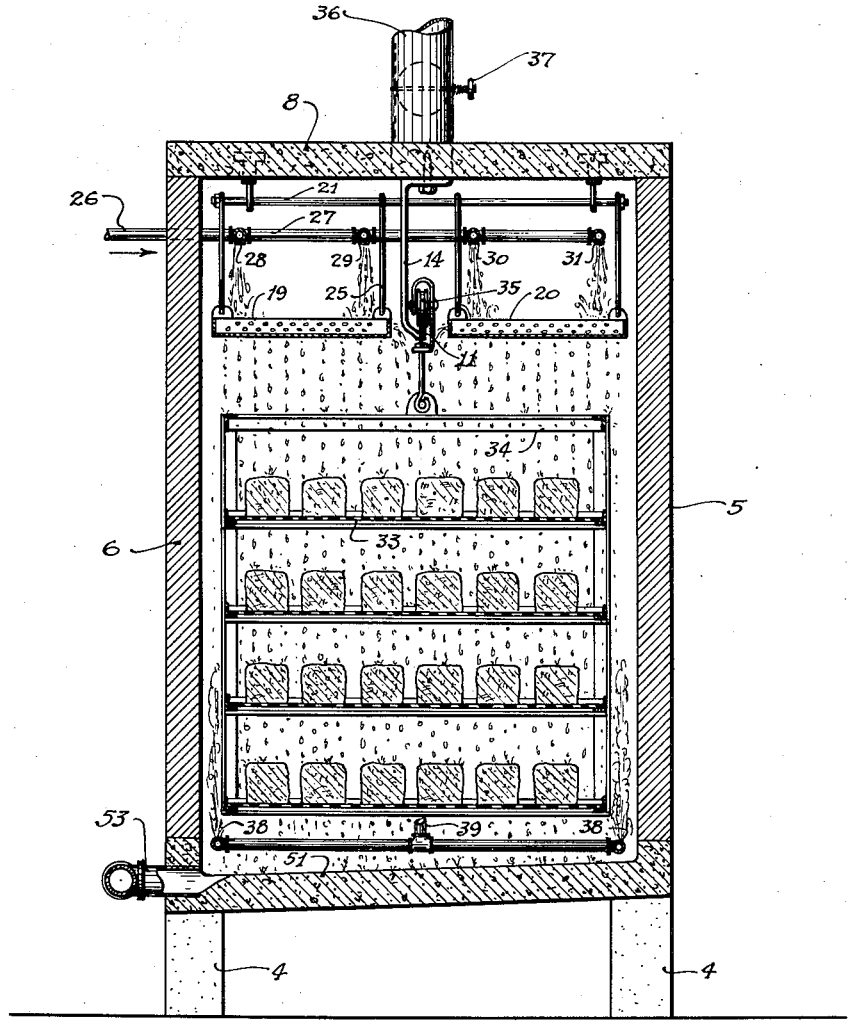
Figure 5 is a sectional view showing the cooking chamber in operation.

The chief elements of the present invention are shown in Figure 1, and comprising a product chamber 1, a smoke box 2, and a color tank 3.

The product chamber 1 is mounted on a concrete standard 4, and has tile side walls 5 and 6, tile rear wall 7, concrete ceiling 8, and front doors 9 and 10. Trolley rail 11 is supported exteriorly of the chamber by strap 12 and interiorly by strap hangers 13, 13a, 14, 15, 16, and 16a, rigidly affixed to ceiling 8. Perforated pans 17, 18, 19, and 20, suspended from rods 21, 22, and 23, which are affixed to ceiling 8, are provided at each corner with an eye 24 and a hook rod 25 to be hooked on rods 21, 22, and 23.

Hot water in which color may be dissolved, enters through line 26, and is fed from header 27 to lines 28, 29, 30, and 31, through outlets 28a, 29a, 30a, and 31a, into pans 17, 18, 19, and 20, being distributed through the perforations in the pans and permitted to fall in the form of rain over the product in the chamber.

The product 32 may be piled on rack 33 of trolleys 34, suspended from trolley wheels 35 on trolley rail 11. Vapors, gases and smoke may be carried off through stack 36 provided with damper 37.

Steam may be admitted into the chamber through perforated steam line 38, fed by line 39 from a source not shown.

Pigment dissolved in water or any other appropriate fluid, is stored in color tank 3, from which it is pumped through line 39, by pump 40, operated by motor 41, by direct drive 42, thence through lines 43, 44, 45, and 26. The valve 46 is provided in line 44 to shut off the flow of colored fluid. Line 47 provided with shut off valve 48, may feed hot water to line 44 to mix with colored fluid from tank 3 to be carried in the direction of the arrows ultimately through the pipes 28, 29, 30, and 31 which have already been described. Line 49 provided with valve 50 is similarly provided for passing cold water through the system. For example, if the chamber is loaded with frankfurters or other meat which it is desired to color, valve 50 is closed, the pump 40 is started, and valves 46 and 48 opened, thus drenching the product with colored hot water falling in the form of rain through the perforations in pans 17, 18, 19, and 20. If it is desired to cool the product, the pump 40 is stopped, valves 46 and 48 closed, and the valve 50 opened, passing cold water through the system. Of course, if it is desired to cook product with a falling rain of hot water, valves 46 and 50 may be closed and valve 48 opened, thus passing uncolored hot water through the system.

The floor 51 of the chamber is pitched toward drain 52 leading to pipe 53 connected to pipe 54, thence to color tank 3 by line 55. Line 54 is provided with valves 56 and 57. If it is desired to pass the fluid falling from the pans to a sewer, valve 56 is closed and valve 57 opened, thus permitting the fluid to drain through line 58 to the sewer, not shown.

If it is desired to recirculate the colored water, valve 57 is closed and valve 56 is opened, thus draining the fluid back into color tank 3, through lines 53, 54, and 55.

Smoke box 2 is mounted upon standard 59 and includes ash pit 60, fire box 61 and hopper 62. Access to ash pit 60 is gained through smoke tight door 63 provided with handle 64. Access to fire box 61 is gained through smoke tight door 65, which may be tightly closed by wing nut 66. When the fire is started embers are placed in fire box 61 on grate 67, and doors 64 and 65 are tightly closed. The valve 68 in air line 69 is opened to admit air under pressure, supplied through air line 69 from a source not shown. The valve 68 may be closed when compressed air is not desired. Saw dust is loaded into hopper 62 from the top, cover 70 being replaced after loading. Partition 71 is provided in hopper 62 to facilitate feeding of saw dust, which has a tendency to adhere in the absence of such a partition.

After the fire is started, valve 68 is closed and valve 72 in steam line 73 is opened. Steam from a source not shown, passes through line 73 and is emitted at nozzle 74 in smoke line 75, drawing smoke from ash pit 60 through lines 76 and 77, to line 75 and thence out into the chamber. It will be noted that line 75 is provided with lip 78 to prevent grease, water and sediment from entering line 75 and passing down into ash pit 60.

It will be noted that door 63 may be tightly closed by means of wing nuts 79 and 80.

In the form of the invention shown in the drawings, after the product is loaded into the chamber, the doors 9 and 10 are closed. Recess 81 in door 9 and recess 82 in door 10 cooperate to accommodate rail 11. The doors when closed are held tight by latch 83.

The device may be used for the cooking and coloring of sausage, such as frankfurters. After the chamber is loaded and the doors are closed, cooking temperatures are secured by admitting steam to the chamber through line 39. Colored water from color tank 3 is admitted through line 26 and recirculated in the manner already described for a sufficient length of time to give the desired color, and the used colored water then passed to the sewer. Valve 46 is then closed and valve 48 opened to drench the sausage with hot water for the removal of excess colored water on the surface, after which valve 48 is closed and valve 50 opened, admitting cold water through line 26 to cool the product and set the color. The steam which has been entering through line 39 is, of course, shut off as the product will have by this time been cooked.

If it is desired to smoke the product, this may be done simultaneously by operation of the smoke box 2, smoke being admitted through line 75. The closing of valve 68 causes a dense smudge to be formed, which is drawn into the chamber by the force of the steam passing out at nozzle 74.

A record of the heat treatment accorded the product is kept by the recording thermometer 84. The operator may determine the temperature at any given time without opening the doors of the cooker by observing thermometer 85.

It will be seen, therefore, that the present invention provides an apparatus with which product may be cooked, smoked, colored, washed, steam treated, or treated with hot or cold water, in such combinations or in such sequence, as may be desired, and eliminates the necessity of providing separate equipment for these various treatments, permitting in addition, simultaneous treatment such as could not be secured in separate equipment.

It will be understood that changes in the details of the construction and arrangement of parts may be made in the embodiment of the invention which has been heretofore described by way of illustration and not by way of limitation, without departing from the spirit of the invention as defined in the claims which follow.

I claim:

1. A meat treatment device comprising a chamber, means for the introduction of fluid near the top of said chamber, means disposed below said fluid introduction means for the introduction of fluid, a perforated steam pipe for the introduction of steam, a smoke box, a smoke inlet pipe leading from said smoke box to said chamber and a steam inlet pipe provided with a nozzle within said smoke inlet pipe.

2. A meat treatment device comprising a chamber, a perforated steam pipe in said chamber, a smoke box, a smoke inlet pipe leading from said smoke box to said chamber, and a steam nozzle in said smoke inlet pipe.

3. In a meat treatment chamber, a smoke box, a smoke inlet pipe leading from said smoke box through the side of said chamber and a steam nozzle within said smoke inlet pipe.

4. In a meat treatment chamber, a smoke box, a smoke inlet pipe leading from said smoke box through the side of said chamber, a steam nozzle within said smoke inlet pipe, and a lip on said smoke inlet pipe forming a shield.

5. In a meat treatment chamber adapted for the treatment of a meat product with a fluid and for smoking and cooking the fluid treated product, a housing, a fluid line near the top of said housing for the introduction of a fluid, a series of discharge lines leading from said fluid line, perforated pans positioned below said discharge lines for finely dividing the fluid discharged within said housing, means for introducing a coloring pigment within the fluid discharged within said housing, a perforated steam line for the introduction of steam within said housing, a smoke inlet pipe communicating with said housing and a steam inlet pipe provided with a nozzle within said smoke inlet pipe.

6. In a meat treatment chamber adapted for the treatment of a meat product with a fluid and for smoking and cooking the fluid treated product, a housing, a fluid line near the top of said housing for the introduction of a fluid, means for recirculating the fluid introduced within the housing through said fluid line, means for introducing a coloring pigment within the fluid while being recirculated, a perforated steam line for the introduction of steam within the housing, a smoke inlet pipe communicating with said housing, and a steam inlet pipe provided with a nozzle within said smoke inlet pipe.

7. In a meat treatment chamber adapted for the treatment of a meat product with a fluid and for smoking and cooking the fluid treated product, a housing, a fluid inlet line near the top of said housing for the introduction of a fluid, a line communicating with said fluid line for introducing a chilling fluid within said housing, a line communicating with said fluid line for introducing a heating fluid within said housing, means for recirculating the fluid introduced within said housing through said fluid line, means for introducing a coloring pigment within the fluid while being recirculated, a perforated steam line for the introduction of steam within said housing, valve means for each of said steam and fluid lines for controlling the relative flow of steam and fluids within said housing, a smoke inlet pipe communicating with said housing and a steam inlet pipe provided with a nozzle within said smoke inlet pipe.

8. In a meat treatment chamber adapted for the treatment of a meat product with a fluid and for smoking and cooking the fluid treated product, a housing, a fluid line near the top of said housing for the introduction of a fluid, means for introducing a chilling fluid through said fluid line, means for introducing a heating fluid through said fluid line, means for recirculating the fluid introduced within said housing through said fluid line, means for introducing a coloring pigment within the recirculated fluid, a perforated steam line for the introduction of steam within said housing, valve means for each of said steam and fluid lines for controlling the relative flow of steam and fluids within said housing, a smoke box, a smoke conduit leading from said smoke box to said housing and a steam inlet pipe provided with a nozzle within said smoke conduit.

9. In a meat treatment chamber adapted for the treatment of a meat product with a fluid and for smoking and cooking the fluid treated product, a housing, a fluid line near the top of said housing for the introduction of a fluid, means for introducing a chilling fluid through said fluid line, means for introducing a heating fluid through said fluid line, means for recirculating the fluid introduced within said housing through said fluid line, means for introducing a coloring pigment within the recirculated fluid, a perforated steam line for the introduction of steam within said housing, valve means for each of said steam and fluid lines for controlling the relative flow of steam and fluids within said housing, a smoke box, a smoke conduit leading from said smoke box to said housing, a steam inlet pipe provided with a nozzle within said smoke conduit and a lip on said smoke inlet pipe forming a shield.

10. In a meat treatment chamber adapted for the treatment of a meat product with a fluid and for smoking and cooking the fluid treated product, a housing, a fluid line near the top of said housing for the introduction of a fluid, means for introducing a chilling fluid through said fluid line, means for introducing a heating fluid through said fluid line, means for recirculating the fluid introduced within said housing through said fluid line, means for introducing a coloring pigment within the recirculated fluid, a perforated stream line for the introduction of steam within said housing, valve means for each of said steam and fluid lines for controlling the relative flow of steam and fluids within said housing, a smoke box, a smoke conduit leading from said smoke box to said housing, a steam inlet pipe provided with a nozzle within said smoke conduit, fluid and gas outlets from said housing and means for the disposition of product in said housing.

11. In a meat treatment chamber adapted for the treatment of a meat product with a fluid and for smoking and cooking the fluid treated product, a housing, a fluid line near the top of said housing for the introduction of a fluid, a series of discharge lines leading from said fluid line, perforated pans positioned below said discharge lines for finely dividing the fluid discharged within said housing, means for introducing a coloring pigment within the fluid discharged within said housing, a perforated steam line for the introduction of steam within said housing, and means for introducing smoke within said housing.

12. In a meat treatment chamber adapted for the treatment of a meat product with a fluid and for smoking and cooking the fluid treated product, a housing, a fluid line near the top of said housing for the introduction of a fluid, a series of discharge lines leading from said fluid line, means for finely dividing the fluid discharged within said housing, means for introducing a coloring pigment within the fluid discharged within said housing, a perforated steam line for the introduction of steam within said housing, and means for introducing smoke within said housing.

ROBERT M. JACKSON.

CERTIFICATE OF CORRECTION.

Patent No. 2,060,992.   November 17, 1936

ROBERT M. JACKSON.

It is hereby certified that error appears in the printed specification of the above numbered patent requiring correction as follows: Page 1, first column, line 41, for the word "comprising" read comprise; page 3, second column, line 8, claim 10, for "stream" read steam; and that the said Letters Patent should be read with these corrections therein that the same may confor to the record of the case in the Patent Office.

Signed and sealed this 2nd day of February, A. D. 1937.

(Seal)

Leslie Frazer
Acting Commissioner of Patents.